(12) United States Patent
Burkhard et al.

(10) Patent No.: US 7,619,170 B2
(45) Date of Patent: Nov. 17, 2009

(54) WEIGHING CELL INCLUDING PARALLEL GUIDING MECHANISM CONFIGURED TO TRANSMIT SIGNALS

(75) Inventors: Hans-Rudolf Burkhard, Wila (CH); Markus Bendler, Moenchaltdorf (CH)

(73) Assignee: Mettler-Toledo AG, Greifensee (CH)

( * ) Notice: Subject to any disclaimer, the term of this patent is extended or adjusted under 35 U.S.C. 154(b) by 21 days.

(21) Appl. No.: 11/939,246

(22) Filed: Nov. 13, 2007

(65) Prior Publication Data
US 2008/0121048 A1 May 29, 2008

(30) Foreign Application Priority Data
Nov. 24, 2006 (EP) ................................. 06124719

(51) Int. Cl.
*G01G 7/00* (2006.01)
(52) U.S. Cl. ................................. 177/210 EM; 177/212
(58) Field of Classification Search .......... 177/210 EM, 177/212
See application file for complete search history.

(56) References Cited

U.S. PATENT DOCUMENTS

| | | | | |
|---|---|---|---|---|
| 3,519,095 A | * | 7/1970 | Tomes | 177/210 R |
| 4,099,587 A | | 7/1978 | Kaufmann | |
| 4,331,035 A | * | 5/1982 | Eisele et al. | 73/765 |
| 4,553,618 A | * | 11/1985 | Kusmenskji et al. | 177/185 |
| 4,802,541 A | * | 2/1989 | Bator et al. | 177/212 |
| 5,270,497 A | * | 12/1993 | Komoto | 177/212 |
| 5,347,092 A | * | 9/1994 | Buchs et al. | 177/212 |
| 5,844,174 A | * | 12/1998 | Kuhlmann et al. | 177/50 |
| 5,850,057 A | * | 12/1998 | Veillette | 177/212 |
| 2006/0201719 A1 | | 9/2006 | Burkhard | |
| 2006/0266562 A1 | | 11/2006 | Genoud et al. | |

FOREIGN PATENT DOCUMENTS

| | | |
|---|---|---|
| CH | 593 481 A5 | 12/1977 |
| EP | 1 701 144 A1 | 9/2006 |
| EP | 1 726 926 A1 | 11/2006 |

OTHER PUBLICATIONS

European Search Report dated Mar. 21, 2007 (with English translation of category of cited documents).

* cited by examiner

*Primary Examiner*—Randy W Gibson
(74) *Attorney, Agent, or Firm*—Buchanan Ingersoll & Rooney PC

(57) ABSTRACT

An electromagnetic force-compensation direct-measuring system is disclosed. Referred to as direct-measuring system, it comprises a parallel-guiding mechanism; and a load receiver connected with the parallel-guiding mechanism and connected to a force-compensation device by a force-transmitting rod. The force-compensation device can include at least one permanent magnet and a coil that is electrically connected to a control circuit. At least one component of the parallel-guiding mechanism is configured to transmit electric signals.

21 Claims, 4 Drawing Sheets

WEIGHING CELL INCLUDING PARALLEL GUIDING MECHANISM CONFIGURED TO TRANSMIT SIGNALS

RELATED APPLICATIONS

This application claims priority under 35 U.S.C. §119 to EP Application 06124719.3 filed in Europe on Nov. 24, 2006, the entire contents of which are hereby incorporated by reference in their entireties.

TECHNICAL FIELD

The disclosure relates to an electromagnetic force-compensation direct-measuring system with a load receiver and a force-compensation device which includes a coil and a permanent magnet.

BACKGROUND INFORMATION

An electromagnetic force-compensation direct-measuring system, hereinafter referred to as direct-measuring system, is distinguished by the fact that the load receiver is connected through a force-transmitting rod directly to the force compensation device.

Under the principle of electromagnetic force compensation, the force that is caused by a load resting on the weighing pan or on the load receiver is counterbalanced by a force-compensation device consisting of at least one permanent magnet and a coil, wherein the current is being measured which flows through the coil in order to generate the compensating force. The value determined by this measurement is proportional to the force placed on the weighing pan. However, the measurement value also depends on the position of the coil in the magnetic field of the permanent magnet, and the coil therefore always has to be in the same position relative to the magnet when taking a measurement. The position of the coil after the load has been applied is measured by way of a position sensor, and the current in the coil is increased until the position change of the coil relative to the permanent magnet which occurred as a result of the load has been compensated. At this point the coil current is measured which, in turn, represents a measure for the weight of the load resting on the weighing pan.

A direct-measuring system is disclosed in CH 593 481 A5, wherein the load receiver is coupled directly to the force-compensation device by way of a force-transmitting rod. Attached to the force-transmitting rod is the moving part of the position sensor, while the stationary part of the position sensor is rigidly connected to the portion of the weighing cell that is in solid connection with the housing or, more specifically, to the stationary portion of the force-compensation device.

This direct-measuring system is used with preference in the range of small weighing loads. The precision of the measurement depends in essence on the resolution and on the arrangement of the position sensor in the direct-measuring system. The load receiver and the coil of the force-compensation device have to be precisely guided in their mobility relative to the stationary part of the weighing cell. This is accomplished through a parallel-guiding mechanism whose movable parallel leg is connected to the force-transmitting rod and whose stationary parallel leg is rigidly connected to the housing-mounted portion of the weighing cell. The movable parallel leg and the stationary parallel leg are connected to each other by two parallel guides with thin, flexibly bending pivot areas, so-called flexure pivots. However, it is also possible to use elastically flexible parallel guides, in which case the flexure pivots are omitted. When a load is placed on the load receiver, the force-transmitting rod moves in the direction of the load, causing the parallel guides to be deflected and the flexure pivots or elastically flexible parallel guides to be bent.

The parallel-guiding mechanism normally has a position-restoring force as indicated by its spring constant which, like a load placed on the load receiver, has an effect on the displacement of the coil and should likewise be compensated.

Normally, the coil of the force-compensation device is electrically connected through thin wires to a control circuit. This arrangement has the disadvantage that in addition to providing the electrical connection, the wires also establish a mechanical connection from the stationary to the movable part of the weighing cell. This introduces an additional spring constant into the direct-measuring system, which interacts with the parallel-guiding mechanism and can introduce errors into the weighing result. The wires are normally connected by soldering and are configured as exceptionally thin filaments in order to keep the added spring constant as small as possible. However, the wire filaments are difficult to connect and it can easily happen that one of the wires breaks loose, making the balance inoperable.

The spring constant which results from the mechanical connection of the movable and the stationary part of the weighing cell through the coil circuit connections affects most of all the performance of weighing cells for the range of small weighing loads, and/or in case of a high resolution it affects the weighing result, because in this case even the smallest changes of the spring constants are enough to cause a change of the measurement result.

It has further been found in particular in compact weighing modules with direct-measuring systems for multi-module weighing devices of the type disclosed for example in EP 1726926 A1, that the drift of the zero point of a direct-measuring system is negatively affected if the parts of the parallel-guiding mechanism and/or of the force-transmitting rod that are connected to the position sensor exhibit a different amount of thermal expansion.

SUMMARY

Thus, an object of the disclosure is to provide the capability for the transmission of electrical signals in a direct-measuring system, in particular to supply power to the coil, without introducing an additional spring constant. A further objective is to provide a direct-measuring system with the smallest possible amount of zero-point drift.

An electromagnetic force-compensation direct-measuring system, hereinafter referred to as direct-measuring system, comprises a parallel-guiding mechanism; and a load receiver connected with the parallel-guiding mechanism and connected to a force-compensation device by a force-transmitting rod. The force-compensation device can include at least one permanent magnet and a coil that is connected to a control circuit. At least one component of the parallel-guiding mechanism is configured to transmit analog and/or digital signals.

BRIEF DESCRIPTION OF THE DRAWINGS

The drawings illustrate different exemplary embodiments of a direct-measuring system according to the invention, wherein.

DETAILED DESCRIPTION

Figure 1:
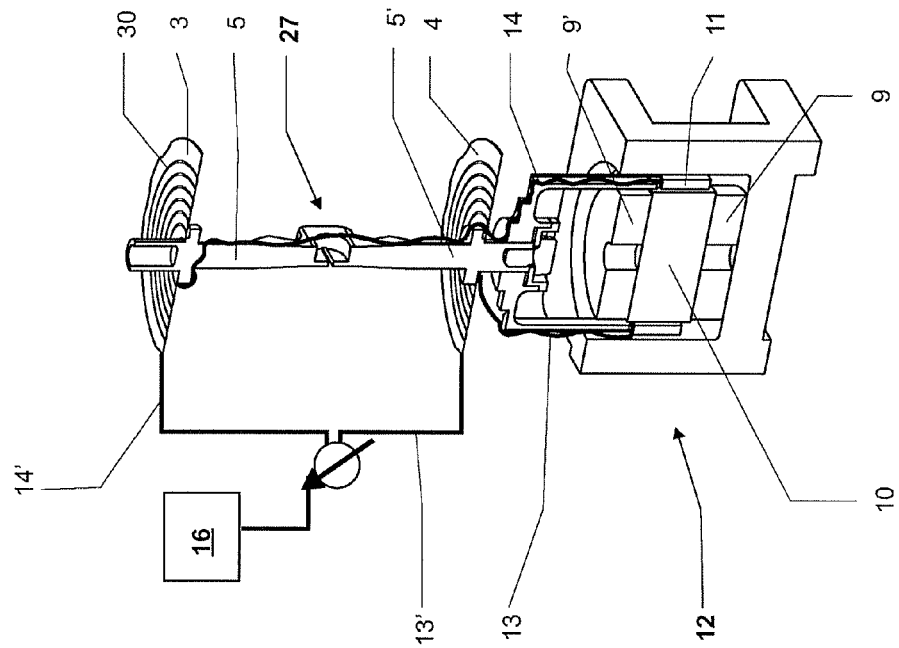
FIG. 1 shows an exemplary direct-measuring system in a sectional view with a load receiver, a force-transmitting rod, a parallel-guiding mechanism and a force-compensation device which has a coil that is connected through at least one component of the parallel-guiding mechanism to a control circuit.

A parallel-guiding mechanism with a plurality of components and a component of the parallel-guiding mechanism as disclosed can be used in the sense of a parallel-guiding mechanism consisting of a plurality of structural parts as well as a parallel-guiding mechanism with a plurality of functional portions or operating parts.

By transmitting electrical signals through at least one component of the parallel-guiding mechanism, it becomes possible to transmit these signals without introducing an additional mechanical connection between the stationary and the movable part of the weighing cell, whereby for example the measurement accuracy, the stability of the zero point as well as the reproducibility of the weighing cell can be improved.

The component of the parallel-guiding mechanism can be electrically tied into the control circuit and serves for the transmission of electric currents and/or power.

The concept of tying the component of the parallel-guiding mechanism into the control circuit makes it possible to supply power to the coil without setting up an additional mechanical connection between the stationary and the movable portion of the weighing cell.

Besides electrical currents, the electrical signals being transmitted can also be analog and/or digital measuring signals and/or control signals which are exchanged between at least one sensor that is arranged in and/or at the direct-measuring system and a measuring- and/or control unit. It suggests itself to direct the electric currents and the measuring- and/or control signals through the same conductor traces and/or through traces that are arranged substantially parallel to each other.

A sensor of this kind can be configured for example for the measurement of temperature, heat flow, pressure, humidity, radiation, acceleration, or other physical or chemical quantities. These sensors provide the capability to check parameters such as the temperature inside the direct-measuring system, which can for example affect the performance of the direct-measuring system and in particular the weighing result. If a direct-measuring system constitutes for example a part of an analytical, thermo-analytical or thermo-gravimetric measuring instrument, the sensors can also serve to measure parameters that are relevant to the measuring principle of the instrument. Such parameters can be for example the temperature or changes of the temperature of a sample placed on the load receiver, or the heat flow through the sample on the load receiver.

The following is substantially a description of the structure of direct-measuring systems in which at least one component of the parallel-guiding mechanism is designed with the capability to transmit electric currents and is tied into the control circuit of the coil. In addition to the electric current signals, it is also possible to direct measurement signals and/or control signals of a measuring- and/or control circuit according to the disclosure through at least one component of the parallel-guiding mechanism, wherein the latter signals can be carried by the same and/or additional conductors.

The component of the parallel-guiding mechanism can consist for example partially and/or in its entirety of an electrically conductive material and can be electrically tied directly into the coil circuit through appropriate electrical contacts, wherein the contact point itself should be electrically insulated in order to avoid undesirable electrical effects.

Furthermore, at least one surface of the component of the parallel-guiding mechanism can be covered partially and/or in its entirety with an electrically conductive coating. With a partial coating, it suggests itself for example to apply the electrically conductive coating in the form of a pattern that forms one or more electrical conductor traces.

If a component of the parallel-guiding mechanism carries a plurality of electrical conductor traces, the latter should be insulated from each other.

The component of the parallel-guiding mechanism can also be configured with a plurality of layers, for example in the form of one or more insulating layers deposited on a conductive core or the form of one or more conductive layers deposited on an insulating core.

In an exemplary embodiment, a component of the parallel-guiding mechanism comprises at least two conductor traces that are insulated from each other, so that the component is capable of transmitting electrical signals. This component of the parallel-guiding mechanism can be connected to the control circuit and/or to the measuring- and/or control circuit. An exemplary configuration of this kind is useful in the case of a complex parallel-guiding mechanism.

An exemplary direct-measuring system can have a parallel-guiding mechanism in a variety of configurations. The parallel-guiding mechanism can for example have a movable parallel leg and a stationary parallel leg which are connected to each other through rigid parallel guides by means of thin, flexibly bending pivot areas.

An exemplary component of the parallel-guiding mechanism is a parallel leg and/or a parallel guide.

The parallel-guiding mechanism in a further exemplary embodiment has at least two parallel-guiding members, for example in the form of elastically resilient, diaphragm-like parallel-guiding elements with suitably contoured cutout portions to form within the diaphragm a stationary parallel leg as well as a movable parallel leg which are connected through at least one parallel guide. Parallel-guiding members of this type are disclosed among other things in EP 1726926 A1. In an exemplary embodiment of this kind, the parallel-guiding member or at least a parallel guide formed in it and/or at least one parallel leg formed in it can serve for the transmission of electric signals and can be tied into the control circuit and/or the measuring- and/or control circuit. To determine the position of the coil after a load has been applied, the direct-measuring system is equipped with a position marker. The position of the position marker can be determined with a suitable sensor arrangement. The position marker can for example be an aperture slot which is arranged on the force-transmitting rod. The known state of the art includes a variety of sensor arrangements to determine the position of the position marker, with an optical sensor being the preferred solution.

The direct-measuring system in a further exemplary embodiment includes a parallel-guiding mechanism which includes an upper and a lower parallel-guiding member and is distinguished by the fact that the position marker is arranged essentially midway between the upper and the lower parallel-guiding member.

For such an exemplary arrangement, the thermal expansion of the parts of the force-transmitting rod that are connected to the position marker as well as the thermal expansion of the upper and the lower parallel-guiding member are substantially equal and will therefore hardly have an effect on the zero point drift of the direct-measuring system.

The upper and the lower parallel-guiding member can be arranged in particular between the load receiver and the force-compensation device.

The position of the position marker can be determined by means of the sensor arrangement which is likewise arranged substantially midway between the upper and the lower parallel-guiding member.

Figure 2:
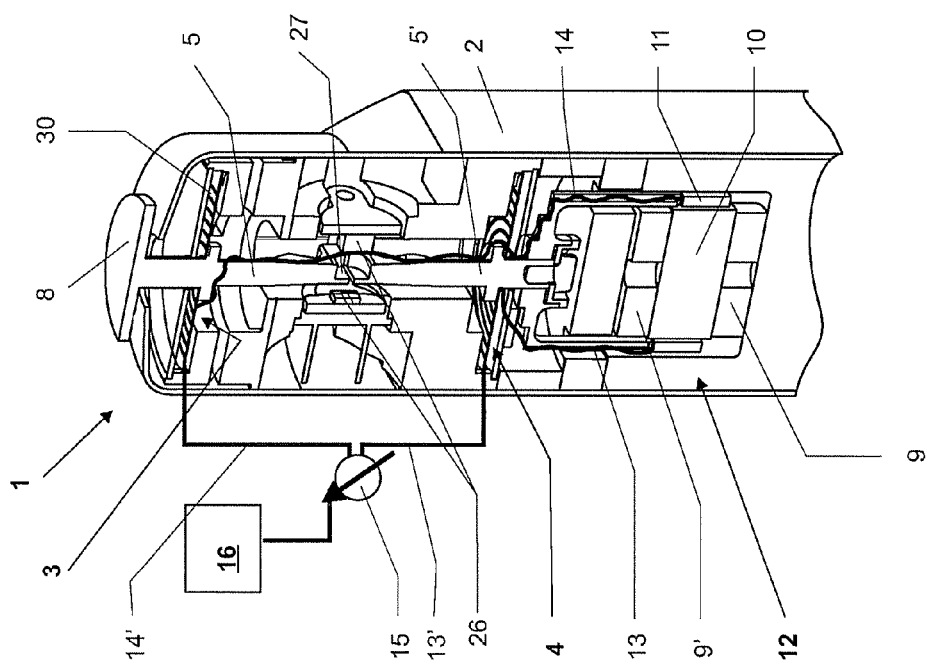
FIG. 2 shows the force-compensation device and the parallel-guiding mechanism of the direct-measuring system of FIG. 1 in a sectional view.

FIG. 1 illustrates an exemplary direct-measuring system 1 in a sectional view with a housing 2. FIG. 2 represents a detail of FIG. 1 without the housing. The following description applies substantially to both FIGS. 1 and 2, wherein identical features have the same reference symbols.

The direct-measuring system 1 has a load receiver 8 which is connected to a force-compensation device 12 by way of a force-transmitting rod 5, 5' and a position marker 27. The load receiver 8 and a coil 11 of the force-compensation device 12 are precisely guided in their movement relative to a housing-connected fixed part 2 of the direct-measuring system 1. This is accomplished with a parallel-guiding mechanism which has two parallel-guiding members 3, 4, whose construction details will be described with the help of FIGS. 3 and 4. The movable parallel legs of the two parallel-guiding members 3, 4 are attached to the force-transmitting rod 5, 5', while the stationary parallel legs are rigidly connected to the stationary part of the force-compensation device 12.

The position marker 27 is arranged at the force-transmitting rod 5, 5' substantially midway between the parallel-guiding members 3, 4. The position marker 27 shown here has the form of a simple aperture slot between the section 5 of the force-transmitting rod that is connected to a load receiver 8 and the section 5' of the force-transmitting rod that is connected to the force-compensation device 12.

The position of the position marker 27, specifically of the aperture slot, is determined optically by means of a stationary sensor arrangement 26. The sensor arrangement 26 is likewise arranged substantially midway between the parallel-guiding members 3, 4. If for example a force is acting on the load receiver 8, the force-transmitting rod 5, 5' moves in the direction of the load, and the position marker 27 changes its position relative to the sensor arrangement 26. By changing the amount of compensation current flowing through the force-compensation device 12, the effect of the load is compensated and the position marker 27 is returned to its original position. The compensation current represents a measure for the weight of the load placed on the load receiver.

The force-compensation device 12 consists of two permanent magnets 9, 9' with a pole piece 10 arranged between them. The pole piece 10 is surrounded by a coil 11 which is only schematically outlined in the drawing. The coil 11 is connected by way of two electrical conductors to a control circuit which is symbolically indicated by the power supply 15. The first conductor includes a conductor section 13 connected directly to the coil 11 and continues through the lower parallel-guiding member 4 and a conductor section 13' which connects the parallel-guiding member 4 to the power supply 15. The second conductor includes a conductor section 14 connected to the coil 11 and continues through the upper parallel-guiding member 3 as well as the conductor section 14'. At least the fastening portions of the conductors, specifically where the conductor sections are attached to the parallel-guiding members 3, 4, are electrically insulated. The compensation current which is directed through the circuit into the coil 11 is controlled by a suitable control unit 16.

Figure 6:
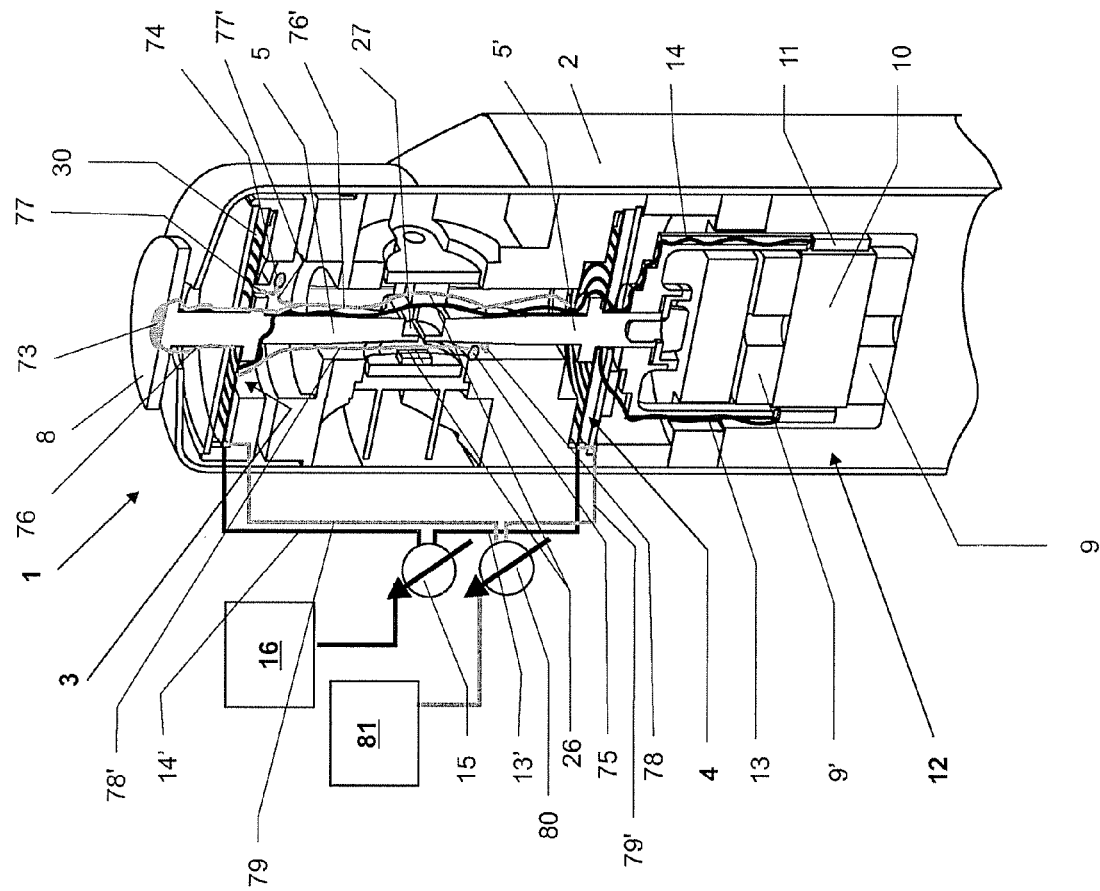
FIG. 6 shows a direct-measuring system in a sectional view with a load receiver, a force-transmitting rod, a parallel-guiding mechanism, a force-compensation device which has a coil that is connected through at least one component of the parallel-guiding mechanism to a control circuit, and at least one sensor that is connected through at least one component of the parallel-guiding mechanism to a measuring- and/or control circuit.

The parallel-guiding members 3, 4 in this example consist of an electrically conductive material, so that they can be tied directly into the control circuit or into a measuring- and/or control circuit which is not shown here (see FIG. 6). Thus, the coil current is channeled through the two parallel-guiding members 3, 4 without thereby introducing an additional mechanical connection between the stationary and the movable part of the weighing cell.

Figure 3:
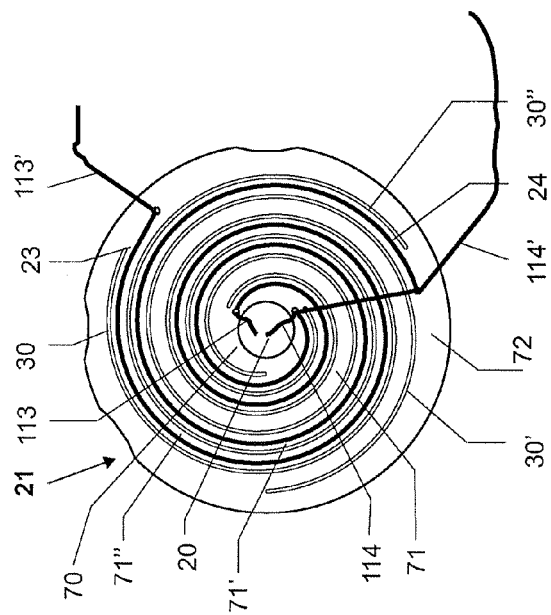
FIG. 3 represents a plan view of a parallel-guiding member with two electrical conductor traces.

FIG. 3 shows a plan view of a parallel-guiding member 21 with two electrical conductor traces 23, 24. The parallel-guiding member 21 in this case has three spiral-shaped perforations 30, 30', 30" which form the contours of a movable parallel leg 70 for connection to the force-transmitting rod, a stationary parallel leg 72 for connection to the housing, as well as three parallel guides 71, 71', 71" which connect the stationary parallel leg and the movable parallel leg to each other. As shown in, FIGS. 1 and 2, the force-transmitting rod is constrained in the opening 20 of the parallel-guiding member 21.

Two of the parallel guides 71', 71" are provided with electrical conductor traces 23, 24, which follow the shape of the parallel guides 71', 71". The conductor traces 23, 24 are electrically insulated form each other by the perforations 30. Methods for producing conductor traces 23, 24 of this type on a surface of the parallel-guiding member 21 belong to the known state of the art and will not be described in detail herein. As an example, the parallel-guiding member 21 may consist of an electrically insulating material on which an electrically conductive material can be deposited in order to form the conductor traces.

One of the two conductor traces 23, 24 is tied into the first conductor and the other is electrically tied into the second conductor. The force-compensation device with the coil is arranged for example below the parallel-guiding members, as shown in FIGS. 1 and 2. The coil and the conductor traces 23, 24 which are formed on the parallel-guiding member 21 illustrated here are connected by way of the conductor sections 113, 114. At their opposite ends, the conductor traces 23, 24 are in contact by way of suitable conductor sections 113', 114" with a power supply (not shown here) as well as a control unit. A parallel-guiding member 21 of this configuration can be installed as an upper and/or lower parallel-guiding member in the direct-measuring system shown in FIGS. 1 and 2.

Since the parallel-guiding member 21 can carry both the inflow and return of the coil current, there is normally only one parallel-guiding member 21 incorporated in the control circuit of the coil.

Figure 4A:
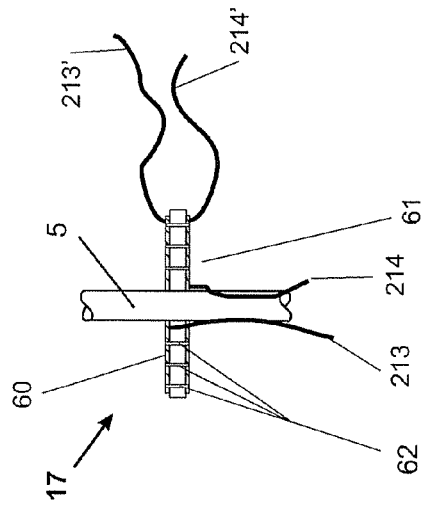
FIG. 4 illustrates a parallel-guiding member with two conductive layers shown in a sectional view and in a plan view.
Figure 4B:
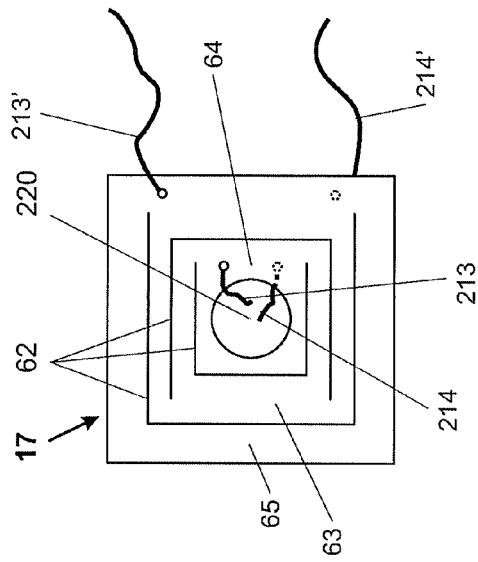

A parallel-guiding member 17 of an alternative design with two conductive layers 60, 61 is shown in a sectional view in FIG. 4a and in plan view in FIG. 4b. The parallel-guiding member 17 has U-shaped perforations 62 as well as a central opening 220 for the force-transmitting rod 5. The U-shaped perforations 62 delineate elastically resilient parallel guides 63 of a back and forth folded shape. The parallel guides 63 connect the movable parallel leg 64 in the center of the parallel-guiding member 17 with the stationary parallel leg 65, wherein the stationary parallel leg 65 surrounds the parallel guides 63 and the movable parallel leg 64 as a closed frame. The border area of the stationary parallel leg 65 can be solidly fixed in the housing with suitable fastener means.

Both surfaces of the parallel-guiding member 17 with the exception of a border area are coated with an electrically conductive material 60, 61. The coating layer 60 with the conductor section 213, 213' establishes one electrical connection and the other coating layer 61 with the conductor section 214, 214' establishes another electrical connection between the coil and the control circuit which are not shown in this drawing. Thus, the current enters the coil for example through the surface of the parallel-guiding member 17 that faces towards the coil, and the return current flows through the surface facing away from the coil, so that in a direct-measuring system with a plurality of parallel-guiding members, only one parallel-guiding member needs to be electrically tied into the control circuit. It is also possible to provide only one surface of the parallel-guiding member with a coating and to connect the coil circuit for example through two parallel-guiding members of identical construction.

The parallel-guiding members shown in FIGS. 3, 4a and 4b can also carry several of the illustrated conductor traces, so that besides a power supply, it is also possible to tie at least one sensor of the direct-measuring system into a measuring- and/or control circuit. The measuring- and/or control signals of the sensor can in this case be directed through the same conductors or conductor traces that are also incorporated in the control circuit, or they can be directed through further conductor traces which are arranged substantially parallel to those of the control circuit (see also FIG. 6).

Figure 5:
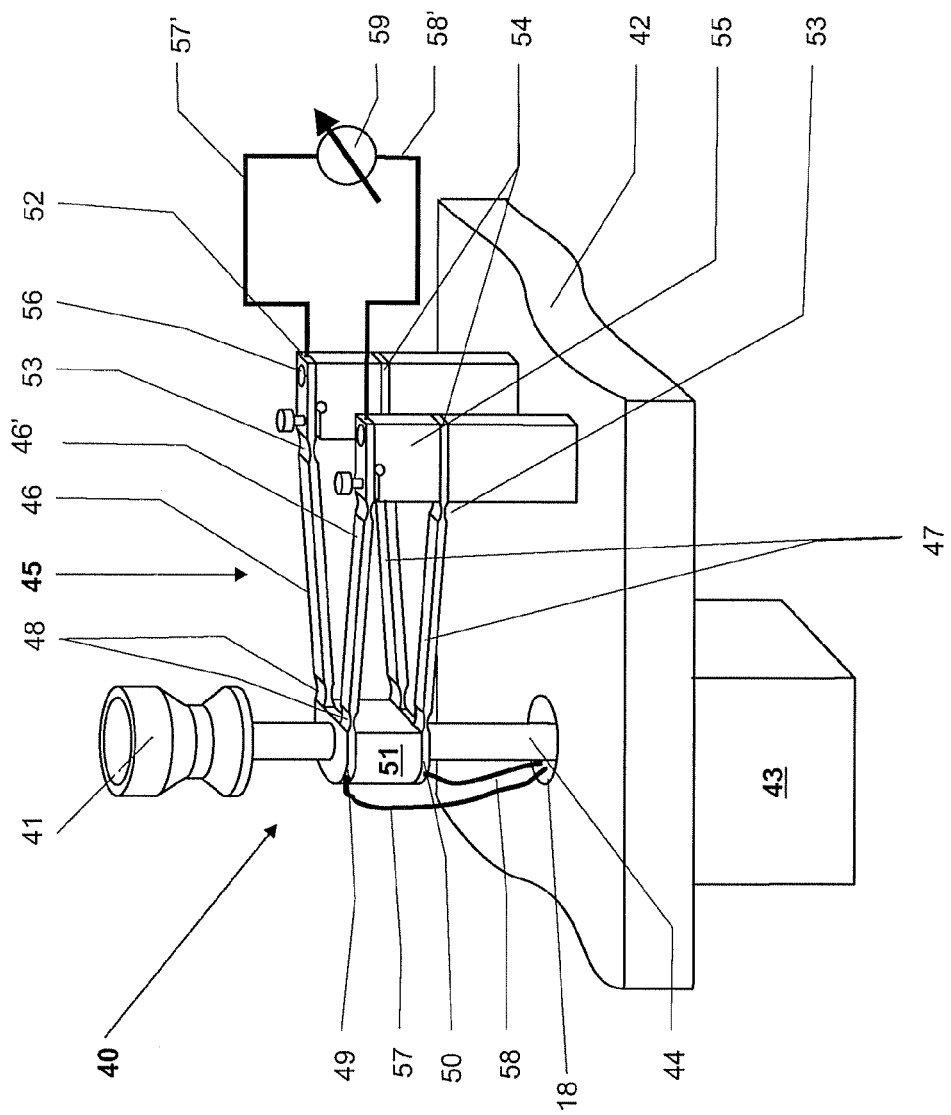
FIG. 5 shows a perspective view of a direct-measuring system with a parallel-guiding mechanism that has two upper and two lower parallel guides.

As a further example of an embodiment of the disclosure, FIG. 5 shows a direct-measuring system 40 with a load receiver 41. A weighing module 40 of this kind can for example be part of a multi-module weighing arrangement in which a plurality of direct-measuring systems is arranged in relation to each other according to a given spatial pattern. The direct-measuring system 40 is rigidly connected to a holding structure 42 with suitable fastener means. The force-compensation device 43 of the weighing module 40 has a coil (not shown here) which is connected to a force-transmitting rod 44. Attached to the top of the force-transmitting rod 44 is the load receiver 41. The force-transmitting rod 44 is connected to the movable parallel leg of a parallel-guiding mechanism 45. This parallel-guiding mechanism has two upper parallel guides 46 and two lower parallel guides 47 which are arranged in V-shaped pairs with the parallel guides of each pair meeting at the movable parallel leg of the parallel-guiding mechanism 45 and are connected to the movable parallel leg through flexure pivots 48, wherein the movable parallel leg is composed of an upper movable parallel leg 49 and a lower movable parallel leg 50 which are separated from each other by the spacer piece 51.

The stationary part of the parallel-guiding mechanism 45 includes the upper stationary parts 52 which are connected to the upper parallel guides 46 through flexure pivots 53, and it further includes the lower stationary parts 54 which are likewise connected through flexure pivots 53 to the lower parallel guides 47, as well as the spacer pieces 55 which separate the upper stationary parts 52 and the lower stationary parts 54 by the same amount from each other as the spacer piece 51. The stationary part of the parallel-guiding mechanism 45 can be rigidly connected to a further weighing cell by screws 56 through the spacer pieces 55, whereby a multi-module weighing device is formed.

The power supply to the coil, which is located in the weighing cell 43, takes place through two conductors that are connected to a power supply 59 and to a control unit (not shown here). The first conductor in the illustrated example includes a conductor section 57 connected to the coil, an upper parallel guide 46, and the conductor section 57'. The second conductor includes a conductor section 58 connected to the coil, the second upper parallel guide 46', and a further conductor section 58'. The conductor sections 57, 58 can be taken through a passage 18 in the holding structure 42 as shown here, but it is also possible for the conductor sections 57, 58, which connect the coil to one of the parallel legs 49, 50, to be arranged inside the force-transmitting rod 44. As has already been described in the context of FIGS. 1 to 4, the conducting parallel guides 46, 47 either have an electrically conductive coating, a trace pattern of an electrically conductive material, or an, electrically conductive core which is insulated on the outside. As another possibility a parallel guide that is electrically insulated against the rest of the parallel-guiding mechanism could be tied into the circuit.

The direct-measuring system shown in FIG. 6 is substantially analogous to the system of FIG. 1. However, the system 1 illustrated here includes in addition at least one sensor 73, 74, 75 which is tied into a measuring- and/or control circuit through at least one component of the parallel-guiding mechanism. Three sensors 73, 74, 75 are shown in FIG. 6 as an example, but an exemplary direct-measuring system could also have more or fewer sensors which are arranged at and/or in the direct-measuring system.

The sensors 73, 74, 75 could be configured for example for the measurement of temperature, heat flow, pressure, humidity, radiation, acceleration, or other physical or chemical quantities.

A first sensor 73 is arranged on the load receiver 8. If the direct-measuring system is part of a thermo-analytical measuring instrument, the first sensor 73 can serve for example to determine temperature changes or to determine the heat flow through a sample arranged on the load receiver 8. The load receiver 8 should in this case be uncoupled from thermal communication with the force-transmitting rod 5. The sensor 73 is connected to two conductor sections 76, 76' through which the sensor 73 is tied into the measuring- and/or control circuit on one side through the upper parallel-guiding member 3 and on the other side through the lower parallel-guiding member 4 (see also FIGS. 3, 4a and 4b).

A second sensor 74 is arranged as an example inside the direct-measuring system 1 below the upper parallel-guiding member 3. Depending on the type of sensor 74 being used, it can serve to determine one or more physical and/or chemical parameters inside the measuring system 1. The sensor 74 is likewise tied into the measuring- and/or control circuit through two conductor sections 77, 77', the upper parallel-guiding member 3 and the lower parallel-guiding member 4.

A third sensor 75 is likewise arranged inside the direct-measuring system near the sensor arrangement 26, more specifically near the position marker 27, and tied into the measuring- and/or control circuit through two conductor sections 78, 78', the upper parallel-guiding member 3 and the lower parallel-guiding member 4.

To prevent the sensors 74, 75 which are arranged inside the direct-measuring system 1 from establishing a mechanical connection between the movable and the stationary portion of the weighing cell, these sensors are arranged inside the balance in such a way that they are in a fixed location relative to the movable portion of the parallel-guiding mechanism and have no contact with the stationary portion of the parallel-guiding mechanism.

The signals of the sensors 73, 74, 75 are carried over the parallel-guiding members 3, 4 and through two further conductor sections 79, 79' to a signal converter 80 which is connected to a control unit 81. Depending on the kind of sensors being used, the latter can be connected to a shared control unit 81 as shown here, or they could also be connected to separate units.

The at least one control unit 81 can be a unit that is used for controlling the direct-measuring system, or it can be a unit that is independent of the control of the direct-measuring system.

Due to the design structure of the direct-measuring system and the possibility to arrange this kind of direct-measuring system in an array with a plurality of systems, it suggests itself to arrange at least one measuring- and/or control circuit largely in the interior of the direct-measuring system and to use the various arrangements shown already in FIGS. 1 to 5 for conducting current also for the transmission of signals.

The analog or digital signals of the sensors, the signals for controlling the sensors, as well as the power supply of the sensors can either be directed together with the power supply loop of the coil through the same conductor traces or through traces that are substantially parallel to the coil conductor traces in the manner that is shown as an example in FIG. 6.

As in the case of the direct-measuring system shown FIGS. 1 and 6, the direct-measuring system shown in, FIG. 5 can likewise have at least one sensor and, connected to the latter, at least one measuring- and/or control circuit, wherein at least one component of the parallel-guiding mechanism is tied into the measuring- and/or control circuit.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1 direct-measuring system
2 housing
3 parallel-guiding member
4 parallel-guiding member
5 force-transmitting rod
8 load receiver
9, 9' magnet
10 pole piece
11 coil
12 force-compensation device
13, 13', 113 conductor section
113', 213, 213' conductor section
14, 14', 114 conductor section
114', 214, 214' conductor section
15 power supply/control circuit
16 control unit
17 parallel-guiding member
18 passage
20, 220 opening
21 parallel-guiding member
23 electrically conductive pattern/trace
24 electrically conductive pattern/trace
26 sensor arrangement
27 position marker
30, 30', 30" perforation
40 direct-measuring system
41 load receiver
42 holding structure
43 force-compensation device
44 force-transmitting rod
45 parallel-guiding mechanism
46, 46' upper parallel guide
47 lower parallel guide
48 thin flexure pivot
49 upper movable parallel leg
50 lower movable parallel leg
51 spacer piece
52 upper stationary part
53 thin flexure pivot
54 lower stationary part
55 spacer piece
56 screws
57, 57' conductor section
58, 58' conductor section
59 power supply
60 electrically conductive coating
61 electrically conductive coating
62 perforations
63 parallel guide
64 movable parallel leg
65 stationary parallel leg
70 movable parallel leg
71, 71', 71" parallel leg
72 stationary parallel leg
73 first sensor
74 second sensor
75 third sensor
76, 76' conductor section
77, 77' conductor section
78, 78' conductor section
79, 79' conductor section
80 signal converter
81 control unit

What is claimed is:

1. Electromagnetic force-compensation direct-measuring system comprising:
   a parallel-guiding mechanism; and
   a load receiver connected with the parallel-guiding mechanism and connected to a force-compensation device by a force-transmitting rod, wherein the force-compensation device includes at least one permanent magnet and a coil that is connected to a control circuit, and wherein at least one component of the parallel-guiding mechanism is configured to transmit analog and/or digital signals.

2. System according to claim 1, wherein said component of the parallel-guiding mechanism is tied into the control circuit and serves for transmission of electric currents.

3. System according to claim 2, wherein the direct-measuring system comprises:
   at least one sensor that is connected to at least one of said control circuit and a second circuit designed as a measuring- and/or control circuit, wherein the component of the parallel-guiding mechanism is tied into the control circuit and/or the second circuit, and serves for the transmission of measurement and/or control signals.

4. System according to claim 3, wherein the sensor is designed as a temperature sensor, heat flow sensor, pressure sensor, humidity sensor, radiation sensor, or acceleration sensor, or for the measurement of other physical or chemical quantities.

5. System according to claim 3, wherein said component of the parallel-guiding mechanism consists of a conductive material.

6. System according to claim 3, wherein at least one surface of the component of the parallel-guiding mechanism comprises:
   a conductive coating layer.

7. System according to claim 6, wherein the component of the parallel-guiding mechanism comprises:
   at least two conductor traces that are electrically insulated from each other.

8. System according to claim 1, wherein said component of the parallel-guiding mechanism is a parallel leg and/or a parallel guide.

9. System according to claim 8, wherein a parallel-guiding member comprises:
   at least one stationary parallel leg and at least one movable parallel leg which are connected to each other by at least one parallel guide.

10. System according to claim 1, comprising:
    a position marker, wherein the parallel-guiding mechanism includes at least one upper parallel-guiding member and at least one lower parallel-guiding member, the position marker being arranged substantially midway between the upper parallel-guiding member and the lower parallel-guiding member.

11. System according to claim 10, wherein the lower parallel-guiding member and the upper parallel-guiding member are arranged between the load receiver and the force-compensation device.

12. System according to claim 10, comprising:
    a sensor arrangement serving to control the position of the position marker.

13. System, according to claim 12, wherein the sensor arrangement is arranged substantially midway between the upper parallel-guiding member and the lower parallel-guiding member.

14. System according to claim 1, comprising:
    at least one sensor that is connected to said control circuit or to a second circuit designed as a measuring and/or control circuit, wherein the component of the parallel-guiding mechanism is tied into the control circuit and/or the measuring circuit and serves for transmission of measurement and/or control signals.

15. System according to claim 1, wherein said component of the parallel-guiding mechanism consists of a conductive material.

16. System according to claim 2, wherein said component of the parallel-guiding mechanism consists of a conductive material.

17. System according to claim 1, wherein at least one surface of the component of the parallel-guiding mechanism comprises:
    a conductive coating layer.

18. System according to claim 2, wherein at least one surface of the component of the parallel-guiding mechanism comprises:
    a conductive coating layer.

19. System according to claim 1, wherein the component of the parallel-guiding mechanism comprises:
    at least two conductor traces that are electrically insulated from each other.

20. A force-compensation device comprising:
    a permanent magnet;
    a control circuit;
    a coil that is electrically connected to the control circuit; and
    a parallel-guiding mechanism having at least one component configured to transmit analog and/or digital signals of the control circuit, wherein a load receiver is connected to the force-compensation device by a force-transmitting rod.

21. System according to claim 20, comprising:
    at least one sensor that is connected to said control circuit or to a second circuit designed as a measuring and/or control circuit, wherein the component of the parallel-guiding mechanism is tied into the control circuit and/or the measuring circuit and serves for transmission of measurement and/or control signals.

* * * * *